United States Patent [19]
Blair

[11] 3,853,146
[45] Dec. 10, 1974

[54] THROTTLE VALVE

[75] Inventor: William G. Blair, Ormond Beach, Fla.

[73] Assignee: Blair Engineering, Inc., Ormond Beach, Fla.

[22] Filed: Sept. 12, 1973

[21] Appl. No.: 396,606

Related U.S. Application Data

[63] Continuation-in-part of Ser. No. 136,721, April 23, 1971, Pat. No. 3,780,531.

[52] U.S. Cl.......... 137/625.3, 137/625.37, 251/282, 251/324
[51] Int. Cl............................................. F16k 3/24
[58] Field of Search ......... 251/324, 282; 137/625.3, 137/625.37

[56] References Cited
UNITED STATES PATENTS

| | | | |
|---|---|---|---|
| 1,164,600 | 12/1915 | Forster | 137/625.37 |
| 1,488,878 | 4/1924 | Heath | 251/324 |
| 2,918,087 | 12/1959 | Curran | 137/625.3 |
| 2,989,081 | 6/1961 | Olsen | 137/625.37 |
| 2,995,337 | 8/1961 | Tanner | 251/282 |
| 3,219,059 | 11/1965 | Williams et al. | 137/625.3 |
| 3,771,554 | 11/1973 | Hassall | 137/625.37 X |

FOREIGN PATENTS OR APPLICATIONS

| | | | |
|---|---|---|---|
| 74,653 | 2/1949 | Norway | 251/205 |
| 1,182,086 | 1/1959 | France | 251/324 |

*Primary Examiner*—Arnold Rosenthal

[57] ABSTRACT

There is disclosed herein a throttle valve having an elongated housing and a piston rod carrying an elongated spool and a relatively short spool spaced axially from the elongated spool. The spools are axially slidable within a sleeve which lines the housing. The sleeve has axially spaced apertures of graduated size allowing transfer of pressure from intake to outlet lines, and the elongated spool progressively closes off or opens the apertures when moved axially. The spacing between the spools is such that the intake line is disposed between the spools in any position of the valve to provide equal axial pressure on the spools and stabilize the valve.

7 Claims, 3 Drawing Figures

THROTTLE VALVE

This is a continuation-in-part of application Ser. No. 136,721, filed Apr. 23, 1971 now U.S. Pat. No. 3,780,531.

This invention relates to a throttle valve for controlling the flow of a pressurized fluid. The valve as disclosed herein provides especially effective throttle means for a hydroturbine apparatus as fully disclosed in detail in the above referred to copending application.

In the embodiment of the invention as herein disclosed, a spool or cylinder type valve is provided with a pair of axially spaced spools connected by a piston rod and axially slidably mounted within a housing. The housing, has an inlet and an outlet and means affording a plurality of axially spaced apertures of graduated size disposed in the path of the fluid between said inlet and outlet. At least one of the spools is elongated whereby upon axial movement thereof the apertures can be sequentially closed or opened to control the flow of fluid. The inlet is so positioned in the housing that it is always aligned with the space between the spools whereby to provide equal axial pressure on the cylinders in opposite directions in every position of the valve to stabilize the valve.

The general object of this invention is to provide an improved throttle valve for controlling the flow of a pressurized fluid.

Another object of this invention is to provide a throttle valve of the type referred to which is stable in all settings thereof.

Still another object of this invention is to provide a throttle valve having the above characteristics which provides means for a very smooth acceleration.

A further object of this invention is to provide a throttle valve which affords means for a very rapid shutoff of the fluid power when desired.

Other objects of the invention and the invention itself will be understood from the following description of two embodiments of the invention as shown in the accompanying drawings, in which said drawings.

Figure 1:
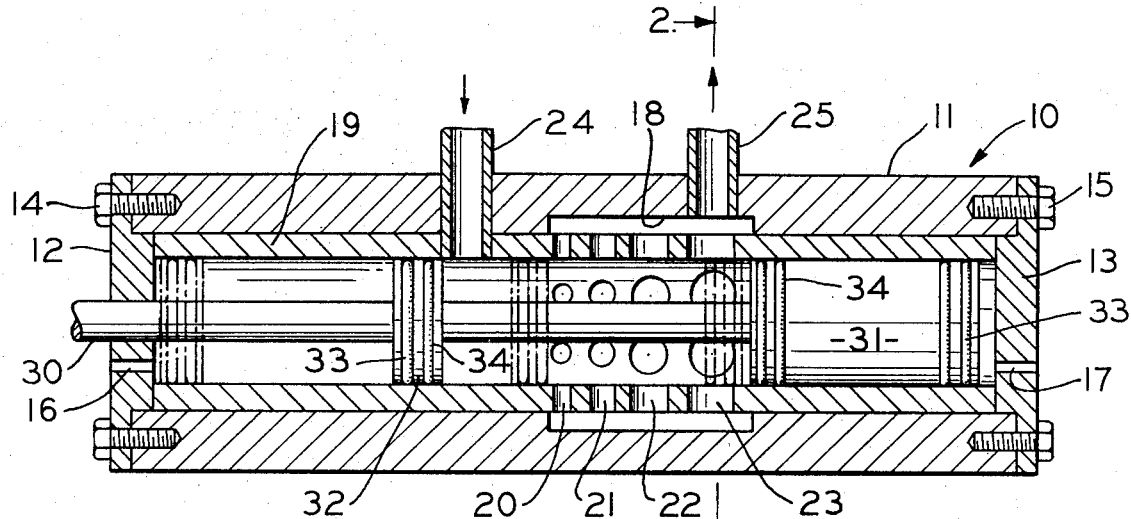
FIG. 1 is a longitudinal section of one embodiment of the throttle valve of this invention.
Figure 2:
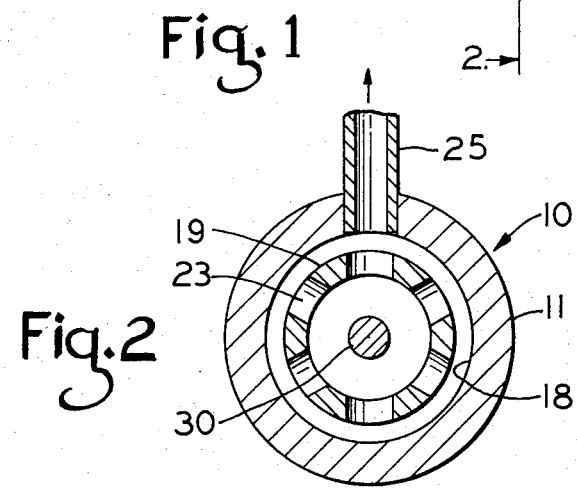
FIG. 2 is a transverse section taken along the line 2—2 of FIG. 1.

Referring now to the drawings in all of which like parts are designated by like reference numerals, the first embodiment of the throttle valve of this invention is generally indicated at 10 and comprises a cylindrical housing 11 capped at the ends by end plates 12 and 13 secured to the ends of said housing by any suitable means such as bolts 14 and 15, respectively. Said end plates 12 and 13 are also provided with relief apertures 16 and 17, respectively, to equalize pressure and exhaust trapped air or steam. The inner peripheral surface of the cylindrical housing 11 is provided with an annular recess 18 which extends axially a substantial distance in the medial portion of the valve. A closely fitting sleeve 19 is disposed within said housing and provided with a plurality of apertures 20, 21, 22, and 23 of graduated size positioned in alignment with the recess 18 whereby said recess affords fluid communication between all said apertures. A line 24 from a suitable steam generating means or other source of pressurized fluid (not herein illustrated) projects through both the cylindrical housing 11 and the sleeve 19 into the interior of said sleeve to provide an inlet for the valve, and an outgoing line 25 projects only through the cylindrical housing 11 and opens into the annular recess 18.

A piston rod 30 of the throttle valve 10 carries a substantially elongated spool or cylinder 31 at its innermost end and a shorter spool or cylinder 32 spaced a substantial distance from said spool 31. Both spools are provided with resilient O-rings 33 seated in annular grooves 34 whereby the spools are provided with a fluid tight seal relative to the inner cylindrical wall of the sleeve 19.

The axial dimension of the spool 31 and the distance between said spool 31 and the spool 32 is such that when the valve is in the position illustrated in FIG. 1 (piston rod 24 pushed in the right-hand direction), said valve is fully opened whereby steam enters through the line 24 between the spools 31 and 32 and is freely exhausted through all of the graduated apertures 20-23 into the annular recess 18 and outwardly through the line 25. As the valve is closed (piston rod 24 moved in the left-hand direction), the elongated spool 31 covers said graduated apertures whereby a progressively smaller amount of steam is allowed to escape through the outgoing line 25. The apertures 20-23 are sized whereby the apertures 20 are the smallest, the apertures 21 are the next largest, the apertures 22 are still larger, and the apertures 23 are largest of all. As the spool 31 moves in the left-hand direction it will be obvious that the larger apertures are closed off first, whereby the power delivered by the throttle valve can be cut down at a substantially rapid rate when desired. For example, in the above referred to application the injector can be shut down with substantial rapidity by using a valve constructed as described.

It will be readily understood that when the spool 31 is in the extreme left-hand position as shown in broken lines in FIG. 1, steam from the steam source entering the line 24 is completely cut off from the outgoing line 25. The steam cannot force the valve open since it is trapped between the two spools 31 and 32 and exerts equal pressure on both spools in the "off" position. It will also be noted that the inlet line 24 is always aligned with the space between the spools 31 and 32 whereby the pressure exerted in either axial direction on said spools is always equal thereby affording a completely stable valve which will hold any adjusted position in use.

Figure 3:
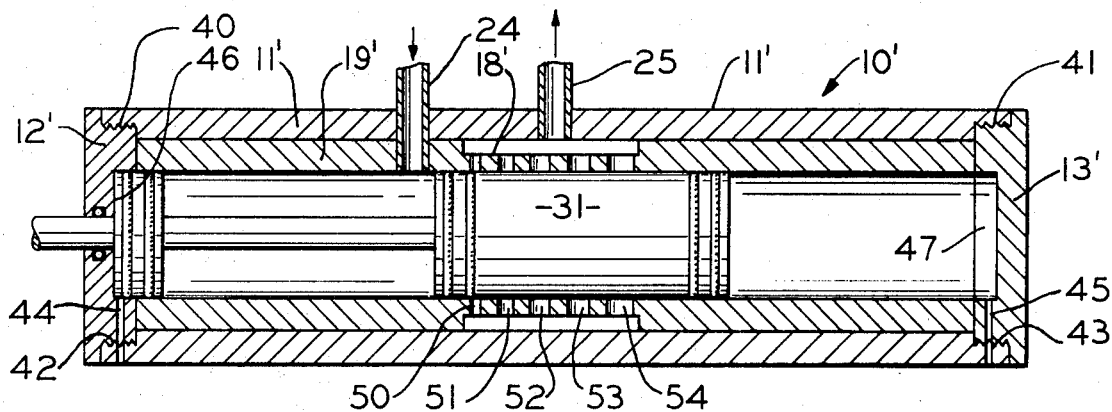
FIG. 3 is a sectional view similar to FIG. 1 showing a slightly modified embodiment of the throttle valve of this invention.

The modification of the throttle valve of this invention shown in FIG. 3 is substantially the same as the first embodiment, there being a modification of the end cap structures and a different placement of the relief apertures as will herein later become clear. Those parts which remain unchanged are provided with the same reference numerals as corresponding parts in FIG. 1, and the parts which have been modified with respect to FIG. 1 have been given the same reference numeral primed. Thus the embodiment of FIG. 3 comprises a throttle valve 10' comprising a cylindrical housing 11', an inner sleeve 19', and end plates 12' and 13'. The remaining parts are unchanged with respect to the first embodiment both in form and function and need not further be described.

The end caps 12' and 13' are secured to the ends of the cylindrical housing 11' by means of threaded portions 40 and 41 engaging internally threaded recesses 42 and 43, respectively, at the ends of said housing 11'. Thus the need for the bolts 14 and 15 of the first embodiment are eliminated.

Instead of the axially directed relief apertures 16 and 17 of the first embodiment, the embodiment of FIG. 3 is provided with drain apertures 44 and 45 drilled or otherwise provided through the housing 11' and extending inwardly into the threaded portions 40 and 41 of the end plates 12' and 13', respectively. Said end plates 12' and 13' are provided at their inner surfaces with circular recesses 46 and 47, respectively, of the same size as, and effectively providing an extension of, the sleeve 19'. The drain apertures 44 and 45 intersect the recesses 46 and 47, respectively, and provide not only relief apertures for the escape of trapped air or steam but also drain holes for the escape of condensed steam or water.

The modification of FIG. 3 further differs from the first form of the invention in that the sleeve 19' is provided with an outer circumferential recess 18' which interconnects a plurality of apertures 50, 51, 52, 53, and 54 of respectively increasing size which are sequentially opened or closed by the elongated cylinder or spool 31. Thus, in the second form of the invention, there is no need for an inner recess such as that shown at 18 in FIG. 1.

From the foregoing it will be seen that the present invention provides a very effective throttle valve which when first opened uncovers substantially smaller ports gradually increasing in size as the valve opens, thereby providing a smooth delivery of power and acceleration to the desired source. It will be further readily seen that when a fast shutdown is needed, the larger apertures are closed off first thereby very rapidly cutting off the power.

It will be understood that many changes in the details of the invention as herein described and illustrated may be made without, however, departing from the spirit thereof or the scope of the appended claims.

I claim:

1. A throttle valve for controlling a pressurized fluid comprising a housing having a bore; a pair of axially spaced spool members slidably mounted within said bore; means for unitarily moving said spool members in said housing and maintaining their spaced relationship; said housing having an inlet line and an outlet line axially spaced from each other and in fluid communication with said bore; means disposed in said housing providing axially spaced apertures of graduated size located in the path of fluid flowing through said valve from said inlet line to said outlet line; said spool members being axially movable to open and closed positions whereby to respectively uncover or cover all of said apertures; one of said spool members having an axial length at least equal to the distance covered by said apertures adapted to progressively cover said apertures and maintain said apertures covered during movement to closed position to control the flow of fluid through said valve and contain the fluid between said spool members; said spools being spaced apart a sufficient distance to cause said inlet line to be disposed between said spools in any position of said spools whereby pressure fluid trapped between said spools exerts equal pressure in both axial directions at all times to stabilize said valve in any position of said spools.

2. A throttle valve as set forth in claim 1 wherein the sizes of said apertures progressively increase in one axial direction whereby when said one spool moves toward the closing position, the largest apertures will be covered first to afford means to effect a rapid shutoff of fluid flow.

3. A throttle valve for controlling a pressurized fluid comprising a housing having a cylindrical bore; a sleeve closely interfitting inside said bore; a plurality of apertures in said sleeve spaced in the axial direction; means defining a recess in the surface of said bore connecting all of said apertures; means providing inlet and outlet fluid passages, said inlet passage extending through said housing and said sleeve at a point axially spaced from said apertures, and said outlet passage intersecting said recess; a pair of axially slidable spool members carried coaxially by a piston rod within said sleeve, said spool members being axially movable to open and closed positions whereby to respectively uncover or cover all of said apertures; one of said spool members being of a length at least equal to the axial distance covered by said apertures and adapted to progressively cover said apertures and maintain said apertures covered during movement to closed position to control the fluid flow and contain the fluid between said spool members; the other of said spool members being spaced axially fron said one spool member a sufficient distance to cause said inlet passage to be disposed between said spools in any position of said throttle valve whereby pressurized fluid is trapped between the two spools and exerts equal pressure in both axial directions at all times to stabilize said valve and prevent fluid pressure from forcing said valve to the open position.

4. A throttle valve as set forth in claim 3 wherein the sizes of said apertures progressively increase in one axial direction whereby when said one spool moves toward the closing position, the largest apertures will be covered first to effect a rapid reduction in fluid flow and whereby when said one spool moves from closed to open position, only the smallest apertures are initially uncovered to effect a smooth delivery of fluid power.

5. A throttle valve as set forth in claim 3 wherein said housing includes end plates secured to said housing and substantially closing the ends of said bore; said end plates having relief apertures therein to exhaust fluid trapped between said spool members and said end plates; one of said end plates affording an opening for said piston rod to project outwardly of said housing.

6. A throttle valve as set forth in claim 1 wherein said housing includes end plates secured to said housing and substantially closing the ends of said bore; one of said end plates affording an opening for said piston rod to project outwardly of said housing; said housing having drain apertures in the bottom thereof adjacent to the ends of said bore which comprise relief apertures for exhausting gaseous fluid trapped between said spool members and said end plates and as drain holes for draining of liquid fluids.

7. A throttle valve for controlling a pressurized fluid comprising a housing having a cylindrical inner surface; a sleeve having a cylindrical outer surface closely interfitting inside said housing; a plurality of apertures in said sleeve spaced in the axial direction; means defining a recess in one of said surfaces connecting all of said apertures; means providing inlet and outlet fluid passages, said inlet passage extending through said housing and said sleeve at a point axially spaced from said apertures, said outlet passage intersecting said recess; a pair of axially spaced spool members slidably mounted within said housing; said spool members being axially movable to open and closed positions whereby to respectively uncover or cover all of said apertures; means for unitarily moving said spool members in said housing and maintaining their spaced relationship, one of said spool members being of a length at least equal to the axial distance covered by said apertures and adapted to progressively cover said apertures and maintain said apertures covered during movement to closed position to control the fluid flow and contain the fluid between said spool members; the other of said spool members being spaced axially from said one spool member a sufficient distance to cause said inlet passage to be disposed between said spools in any position of said throttle valve whereby pressurized fluid is trapped between the two spools and exerts equal pressure in both axial directions at all times to stabilize said valve and prevent fluid pressure from forcing said valve to the open position.

* * * * *